United States Patent
Stockdale et al.

(10) Patent No.: US 12,223,046 B2
(45) Date of Patent: *Feb. 11, 2025

(54) CYBER SECURITY USING ONE OR MORE MODELS TRAINED ON A NORMAL BEHAVIOR

(71) Applicant: Darktrace Holdings Limited, Cambridge (GB)

(72) Inventors: Jack Stockdale, Cambridge (GB); Alex Markham, Cambridgeshire (GB)

(73) Assignee: Darktrace Holdings Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,797

(22) Filed: Oct. 12, 2022

(65) Prior Publication Data

US 2023/0042552 A1    Feb. 9, 2023

Related U.S. Application Data (63) Continuation of application No. 17/141,940, filed on Jan. 5, 2021, now Pat. No. 11,693,964, which is a (Continued)

(30) Foreign Application Priority Data

Aug. 4, 2014 (GB) ..................................... 1413789

(51) Int. Cl.
*H04L 29/06* (2006.01)
*G06F 21/00* (2013.01)
(Continued)

(52) U.S. Cl.
CPC .......... *G06F 21/566* (2013.01); *G06F 21/552* (2013.01); *G06F 21/577* (2013.01); (Continued)

(58) Field of Classification Search
None
See application file for complete search history.

(56) References Cited

U.S. PATENT DOCUMENTS 6,058,260 A * 5/2000 Brockel .............. H04W 84/042
                                                    703/4
6,154,844 A   11/2000 Touboul et al.
(Continued)

FOREIGN PATENT DOCUMENTS

EP    2 922 268 A1   9/2015
WO    01 31420 A1    5/2001
(Continued)

OTHER PUBLICATIONS

Sebyala, A.A., Olukemi, T., Sacks, L.; "Active Platform Security through Intrusion Detection Using Nai've Bayesian Network for Anomaly Detection"; 2002; Proceedings of the London Communications Symposium.
(Continued)

*Primary Examiner* — Lisa C Lewis
(74) *Attorney, Agent, or Firm* — Rutan and Tucker, LLP (57) ABSTRACT

Disclosed herein is a method for detection of a cyber-threat to a computer system. The method is arranged to be performed by a processing apparatus. The method comprises receiving input data associated with a first entity associated with the computer system, deriving metrics from the input data, the metrics representative of characteristics of the received input data, analysing the metrics using one or more models, and determining, in accordance with the analysed metrics and a model of normal behavior of the first entity, a cyber-threat risk parameter indicative of a likelihood of a cyber-threat. A computer readable medium, a computer program and a threat detection system are also disclosed.

17 Claims, 2 Drawing Sheets

Related U.S. Application Data continuation of application No. 16/390,801, filed on Apr. 22, 2019, now abandoned, which is a continuation of application No. 15/501,135, filed as application No. PCT/GB2015/052241 on Aug. 3, 2015, now Pat. No. 10,268,821.

(51) Int. Cl.
  *G06F 21/55* (2013.01)
  *G06F 21/56* (2013.01)
  *G06F 21/57* (2013.01)
  *H04L 9/40* (2022.01)
  *H04L 41/069* (2022.01)

(52) U.S. Cl.
  CPC ........ *H04L 41/069* (2013.01); *H04L 63/1408* (2013.01); *H04L 63/1425* (2013.01); *H04L 63/1433* (2013.01)

(56) References Cited

U.S. PATENT DOCUMENTS

| | | |
|---|---|---|
| 6,965,968 B1 | 11/2005 | Touboul |
| 7,307,999 B1 | 12/2007 | Donaghey |
| 7,418,731 B2 | 8/2008 | Touboul |
| 7,448,084 B1 | 11/2008 | Apap et al. |
| 7,890,869 B1* | 2/2011 | Mayer ................ G06F 21/577 709/224 |
| 8,312,540 B1 | 11/2012 | Kahn et al. |
| 8,661,538 B2 | 2/2014 | Cohen-Ganor et al. |
| 8,819,803 B1* | 8/2014 | Richards ............ H04L 63/1483 709/224 |
| 8,879,803 B2 | 11/2014 | Ukil et al. |
| 8,938,532 B2* | 1/2015 | Terrell ................ H04L 69/22 709/224 |
| 8,966,036 B1* | 2/2015 | Asgekar ............ H04W 4/08 707/706 |
| 9,043,905 B1 | 5/2015 | Allen et al. |
| 9,106,687 B1 | 8/2015 | Sawhney et al. |
| 9,154,516 B1* | 10/2015 | Vaystikh ............ H04L 63/1425 |
| 9,185,095 B1 | 11/2015 | Moritz et al. |
| 9,213,990 B2* | 12/2015 | Adjaoute ............ G06Q 20/12 |
| 9,322,667 B2* | 4/2016 | Marwah ............ G01D 4/00 |
| 9,348,742 B1* | 5/2016 | Brezinski ............ G06F 21/566 |
| 9,401,925 B1* | 7/2016 | Guo ............ G06F 21/552 |
| 9,401,926 B1* | 7/2016 | Dubow ............ H04L 63/1408 |
| 9,516,039 B1 | 12/2016 | Yen et al. |
| 9,516,053 B1 | 12/2016 | Muddu et al. |
| 9,641,544 B1 | 5/2017 | Treat et al. |
| 9,712,548 B2* | 7/2017 | Shmueli ............ H04L 63/1425 |
| 9,727,723 B1 | 8/2017 | Kondaveeti et al. |
| 10,237,298 B1* | 3/2019 | Nguyen ............ H04L 63/1408 |
| 2002/0174217 A1* | 11/2002 | Anderson ............ H04L 43/0876 709/224 |
| 2002/0186698 A1* | 12/2002 | Ceniza ................ H04L 61/2535 370/351 |
| 2003/0070003 A1 | 4/2003 | Chong et al. |
| 2004/0083129 A1* | 4/2004 | Herz ................ G06Q 20/201 726/25 |
| 2004/0167893 A1 | 8/2004 | Matsunaga et al. |
| 2005/0065754 A1 | 3/2005 | Schaf et al. |
| 2007/0118909 A1 | 5/2007 | Hertzog et al. |
| 2007/0294187 A1 | 12/2007 | Scherrer |
| 2008/0005137 A1 | 1/2008 | Surendran et al. |
| 2008/0077358 A1* | 3/2008 | Marvasti ................ G06N 20/00 702/182 |
| 2008/0109730 A1* | 5/2008 | Coffman ................ G06Q 30/02 715/733 |
| 2009/0106174 A1 | 4/2009 | Battisha et al. |
| 2009/0254971 A1 | 10/2009 | Herz et al. |
| 2010/0009357 A1* | 1/2010 | Nevins ................ C12Q 1/6886 435/6.12 |
| 2010/0095374 A1 | 4/2010 | Gillum et al. |
| 2010/0107254 A1* | 4/2010 | Eiland ................ H04L 63/1416 726/23 |
| 2010/0125908 A1 | 5/2010 | Kudo |
| 2010/0150008 A1* | 6/2010 | Sohn ................ H04L 41/22 370/252 |
| 2010/0235908 A1* | 9/2010 | Eynon ................ H04L 63/1425 726/22 |
| 2010/0299292 A1 | 11/2010 | Collazo |
| 2011/0093428 A1 | 4/2011 | Wisse |
| 2011/0213742 A1 | 9/2011 | Lemmond et al. |
| 2011/0261710 A1* | 10/2011 | Chen ................ H04L 43/0876 370/252 |
| 2012/0096549 A1* | 4/2012 | Amini ................ H04L 63/1433 726/23 |
| 2012/0137367 A1* | 5/2012 | Dupont ................ G06F 21/00 726/25 |
| 2012/0209575 A1 | 8/2012 | Barbat et al. |
| 2012/0210388 A1 | 8/2012 | Kolishchak |
| 2012/0284791 A1 | 11/2012 | Miller et al. |
| 2012/0304288 A1 | 11/2012 | Wright et al. |
| 2013/0091539 A1 | 1/2013 | Khurana |
| 2013/0198119 A1 | 8/2013 | Eberhardt, III et al. |
| 2013/0198840 A1* | 8/2013 | Drissi ................ G06F 21/55 726/22 |
| 2013/0254885 A1* | 9/2013 | Devost ................ G06F 21/56 726/23 |
| 2013/0305356 A1* | 11/2013 | Cohen-Ganor ..... H04L 63/1416 726/22 |
| 2014/0007237 A1 | 1/2014 | Wright et al. |
| 2014/0074762 A1 | 3/2014 | Campbell |
| 2014/0165207 A1* | 6/2014 | Engel ................ H04L 41/069 726/25 |
| 2014/0215618 A1 | 7/2014 | Amit |
| 2014/0325643 A1 | 10/2014 | Bart et al. |
| 2015/0067835 A1 | 3/2015 | Chari et al. |
| 2015/0081431 A1 | 3/2015 | Akahoshi et al. |
| 2015/0161394 A1 | 6/2015 | Ferragut et al. |
| 2015/0163121 A1 | 6/2015 | Mahaffey et al. |
| 2015/0172300 A1 | 6/2015 | Cochenour |
| 2015/0180893 A1 | 6/2015 | Im et al. |
| 2015/0213358 A1 | 7/2015 | Shelton et al. |
| 2015/0286819 A1* | 10/2015 | Coden ................ G06F 21/554 726/23 |
| 2015/0310195 A1* | 10/2015 | Bailor ................ G06F 21/45 726/6 |
| 2015/0319185 A1 | 11/2015 | Kirti et al. |
| 2015/0341379 A1 | 11/2015 | Lefebvre et al. |
| 2015/0363699 A1 | 12/2015 | Nikovski |
| 2015/0379110 A1 | 12/2015 | Marvasti et al. |
| 2016/0062950 A1 | 3/2016 | Brodersen et al. |
| 2016/0078365 A1* | 3/2016 | Baumard ................ G06N 5/02 706/12 |
| 2016/0149941 A1 | 5/2016 | Thakur et al. |
| 2016/0164902 A1 | 6/2016 | Moore |
| 2016/0173509 A1 | 6/2016 | Ray et al. |
| 2016/0241576 A1 | 8/2016 | Rathod et al. |
| 2016/0300126 A1* | 10/2016 | Callan ................ G06F 18/2155 |
| 2016/0352768 A1 | 12/2016 | Lefebvre et al. |
| 2016/0373476 A1 | 12/2016 | Dell'Anno et al. |
| 2017/0063907 A1 | 3/2017 | Muddu et al. |
| 2017/0063910 A1 | 3/2017 | Muddu et al. |
| 2017/0063911 A1 | 3/2017 | Muddu et al. |
| 2017/0169360 A1 | 6/2017 | Veeramachaneni et al. |
| 2017/0220801 A1 | 8/2017 | Stockdale et al. |
| 2017/0230391 A1 | 8/2017 | Ferguson et al. |
| 2017/0230392 A1 | 8/2017 | Stockdale |
| 2017/0251012 A1 | 8/2017 | Stockdale et al. |
| 2017/0270422 A1 | 9/2017 | Sorakado |
| 2018/0027006 A1 | 1/2018 | Zimmermann et al. |
| 2018/0167402 A1 | 6/2018 | Scheidler et al. |
| 2021/0157919 A1 | 5/2021 | Stockdale et al. |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |

(56) References Cited

FOREIGN PATENT DOCUMENTS

| WO | 2015027828 A1 | 3/2015 |
|---|---|---|
| WO | 2016020660 A1 | 2/2016 |

OTHER PUBLICATIONS

Zachara, M., Palka, D.; "Detecting Unusual User Behaviour to Identify Hijacked Internet Auctions Accounts"; 2012; Lecture Notes in Computer Science, vol. 7465. Springer, Berlin, Heidelberg.
United States Patent and Trademark Office, Non-Final Office Action, Aug. 10, 2018.
United States Patent and Trademark Office, Non-Final Office Action, Nov. 15, 2019.
United States Patent and Trademark Office, Non-Final Office Action, Mar. 16, 2022.
United States Patent and Trademark Office,, Final Office Action, May 7, 2020.
United States Patent and Trademark Office,, Advisory Action Before Filling of an Appeal Brief, Oct. 27, 2020.
United States Patent and Trademark Office, Examiner's Answer in response to the appeal brief filled on Mar. 8, 2021, Apr. 6, 2021.
United States Patent and Trademark Office, Patent Board Decision—Examiner Affirmed, Jul. 5, 2022.
Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.
Patent Cooperation Treaty, International Search Report, Jan. 2015, 4 pages.
State of Israel Ministry of Justice the Patent Office, Notification of Defects in Patent Application No. 250037, Feb. 7, 2019.

\* cited by examiner

CYBER SECURITY USING ONE OR MORE MODELS TRAINED ON A NORMAL BEHAVIOR

This application claims the benefit of priority under 35 USC 120 from U.S. patent application Ser. No. 17/141,940, filed 5 Jan. 2021, titled 'CYBER SECURITY USING ONE OR MORE MODELS TRAINED ON A NORMAL BEHAVIOR,' which claimed the benefit of priority under 35 USC 120 from U.S. patent application Ser. No. 16/390,801, filed Apr. 22, 2019 titled 'Cyber Security Using One or More Models Trained on Normal Behavior,' which claimed the benefit of priority under 35 USC 120 from U.S. patent application Ser. No. 15/501,135, filed Feb. 1, 2017 titled 'Cyber Security,' and issued as granted U.S. Pat. No. 10,268,821 on Apr. 23, 2019, which claimed priority to PCT application Serial No. PCT/GB2015/052241 as a 371 national stage filing, filed on Aug. 3, 2015, which claimed priority to United Kingdom patent application Serial No. GB1413789.7, filed on Aug. 4, 2014, titled 'Cyber Security,' the contents of all of which are incorporated herein by reference in their entirety.

FIELD OF INVENTION

A method for detection of a cyber-threat to a computer system is disclosed. More specifically, but not exclusively, a method is disclosed comprising determining a likelihood of a threat in accordance with received input data relating to activity on the computer system and a model of normal behavior associated with the computer system.

BACKGROUND TO THE INVENTION

The internet has transformed the way we live our lives and the way business operates. It has transformed the communications of government and official organizations to the extent where its criticality is not in doubt. We have an open and global interconnected economy, and the trend is irreversible. The reliance on digital infrastructure to deliver our core business processes has presented significant risk, making vulnerable our most precious commodity: our data, intellectual property, reputation and increasingly our connected critical national infrastructure.

The past few years have seen an exponential rise in the number of cyber-attacks affecting the networks of businesses of all sizes, and in all sectors. No one is immune to the threat, and whilst the cost to economies is significant, the cost to individual businesses can be catastrophic. The UK's GCHQ reports that 1,000 cyber-attacks are performed every hour in Britain and 33,000 malicious emails blocked every month containing sophisticated malware. In the U.S., the number of cyber intrusions has increased by seventeen times, according to the chairman of the Joint Chiefs of Staff, General Martyn Dempsey.

The US Department of Homeland Security has revealed that twenty-three attacks have been carried out against companies connected to the US gas pipeline alone. The US Defense Science Board reported that hackers had gained access to over twenty-four major military systems, comprising top-secret information, including the designs of anti-ballistic missiles and fighter jets. 93% of large corporations and three quarters of small businesses in the UK are estimated to have had a cybersecurity breach in the past year. So pernicious has the threat become that, by the end of 2012, over half of European Union and NATO member nations had adopted a national cyber strategy.

The international press reports state-sponsored cyber-attacks represent a growing and significant threat, with countries looking to gain competitive commercial or political advantage through either stealing data, or compromising and disrupting key commercial, industrial and economic assets. Yet the threat to commercial companies is far broader than this. Malicious 'insiders' are difficult to detect through conventional methods, as they use legitimate and authorized access to networks to facilitate the theft of critical data and IP. Data loss through negligent behavior (laptops lost, public devices left logged-on to host networks, etc.) remains a threat. In 2012, a major bank lost the details of over 250,000 customers, including names, addresses, dates of birth and Social Security numbers, when unencrypted back-up tapes were lost in transit. Increasing numbers of attacks are delivered against executives travelling to high-risk countries with little or no awareness of either the threat or behavioral mitigations.

Organizations today are faced with more complex data, in higher and higher volumes, and the commercially viable timescales that determine its use and value are getting shorter. Additionally, faced with a rapidly-changing technology base, business is having to engage with and integrate a wide range of increasingly disruptive technologies, such as mobile and cloud-based computing, BYOD (Bring Your Own Device), and a diverse range of social media tools and technologies, just to remain compatible with peers. These technologies must be integrated and offered to staff and customers in relatively short time-scales. The challenge that they represent requires a fundamental shift in traditional perceptions of information security. Organizations are critically dependent on the flow of data between disparate parts of their organizations, to a mobile workforce, and to customers who demand efficient IT services. As a consequence enterprise boundaries have become electronically porous, dynamic and ill-defined. The conventional IT security model that relies on strict border/gateway control, which is analogous to the historical physical defensive methods of moats and drawbridges to keep attackers out, has by universal consensus broken down. By this convention the IT security industry spends considerable effort trying to police the perimeters of the corporate network, and protect it from unauthorized access. The dominant instantiation of this paradigm has been the regular expression driven SIEM (Security Information and Event Management) and signature driven endpoint products in a proliferation of forms.

These forms including many which restrict users' access to the network according to a defined set of corporate security policies. The reality, however, is that many, if not all, large corporate networks are likely to have already been compromised, and that malicious actors, either external or insider, have actively been targeting data. Today's socially-engineered threats, Advanced Persistent Threats and insider attacks by definition cannot simply be locked out. Data now needs protecting in the wild and can no longer exist behind high walls.

Deterministic approaches to threat detection have therefore been taken. Such traditional deterministic approaches are reliant on the assumption that the difference between what is legitimate activity and what is illegitimate activity can be defined. An expanding set of corporate policy and rules have been written to identify client programs as either compliant or not compliant. However, such deterministic approaches require a vast amount of effort to be spent in constantly updating these rules and signatures, in an attempt to stay up to date with the changing threat environment. The definition of what is legitimate is based on what we know about past attacks. For each successful intrusion, a new rule is written, the signature is updated and the next time that same threat presents itself, access is denied or challenged. This method is effective in defending against known threats that have already been identified. However, it is incapable of responding to fresh threats that are constantly presenting either through minor adjustments to existing vectors or more significant evolution of attack methods. Consequently, current threat detection and prevention systems are still being compromised and are unable to keep out threats.

Furthermore, as the technical defenses that protect our data have become more sophisticated, attackers have increasingly turned their attention to the softest part of the network, the user. Socially-engineered attacks account for over 85% of espionage threat, and were the fastest-growing attack vector of 2012. Attackers use subtle and sophisticated methods to manipulate human users to unwittingly install attacks on their behalf, and traditional technical defenses are rendered impotent within a process where a legitimate user has decided to click on a link in a 'weaponized' email or visited a familiar yet now compromised website. These new forms of attack make the problem of detecting threats even harder.

SUMMARY OF INVENTION

Disclosed herein is a more intelligent approach to cyber-threat detection, which embraces the nature of mobile data and porous networks. This new approach is realistic and informed about the threat, and seeks to recognize quiet threats in a noisy environment. Several key assumptions have been challenged in order to understand why knowledge of yesterday's attacks will not defend against those of tomorrow.

It has firstly been recognized that relying on identifying threats based on rules associated with previously identified threats is not sufficiently secure. Consequently, a completely new approach has been developed in order to overcome the problems of such traditional techniques.

It has also been accepted that real human beings are at either end of the attack chain, which allows for a more considered approach to detecting the idiosyncratic human factors that enable cyber threats. Shifting the perception of the threat allows solutions to be created that take as a base assumption the presence of the threat. A method and system is therefore provided in this disclosure that can detect subtle shifts and patterns, changes in behavior both of humans and machines, and highlight hitherto undetected threats.

The indicators of compromise are often subtle and complex. To take the insider threat, according the CERT Insider Threat Center at the Carnegie Mellon University Software Engineering Institute, insiders that are intent on, or considering, malicious attacks often exhibit identifiable characteristics and/or warning signs before engaging in those acts. These signs are often hard to detect as they are often no more than subtle distortions of normal and legitimate behavior. For example the contractor checking into the office building after hours and using the photocopier, a group of files being transferred under a new employee account or a specific email communication being sent out of working hours— such weak pieces of information individually can, seen together, form indicators of mal-intent. These small indicators call for an intelligent approach that is able to see patterns in the information and activity and build an understanding of what is normal at any one time, and what is genuinely anomalous, based on the current threat and network environment. To be operationally viable any such technology must not produce large numbers of false positives currently associated with traditional network intrusion detection systems.

The method and system disclosed herein enable automatic probabilistic real-time detection of cyber threat or compromise to computers and/or networks through changes in the computers and/or networks' behavior. The method and system also permits the automatic detection of human insider staff threat as their potentially malicious behavior is reflected in changes to the pattern of usage in networked office equipment. This is achieved mathematically without any prior knowledge of the threat type so that both established and entirely novel forms of cyber threat vector can be detected without the need for loading pre-determined signature, rules or antiviral updates etc. The result is a novel passive network and host-wide defensive and surveillance capability.

The method and system disclosed herein have a core Bayesian probabilistic model, referred to as the Hyper Cylinder model. Three additional concepts, which are governed by the model are then utilized. These additional concepts may operate independently or in concert with each other. The core model permits automatic detection of cyber threats through probabilistic change in behavior of normal computers and computer networks. This is achieved with a programmatic application of an unsupervised mathematical model used for detecting behavioral change. 'Normal' is not a predefined entity but established dynamically within the model as a function of the real-world activity of each node and or network.

The additional concepts include: 1) the ability to chain sets of user defined heuristics across a computer network and then dynamically modulate their application relative to the governing unsupervised probabilistic 'Hyper Cylinder model; 2) Automatic network wide, self-organising, 3D projection of cyber threat across packet flow, connection topology and changing endpoint attributes; and 3) Detection of ICS and SCADA cyber compromise through contrasting mathematical models of normal device behavior at protocol layer.

The threat detection system disclosed herein may take input from probes in the form of a number of metrics. The metrics may be derived from an environment defined selected combination of: the analysis of full TCP/IP network packet data inspection, third party log file ingestion, endpoint file system and OS parameters, network-level meta data level technologies such as NetFlow and IP Flow Information Export (IPFIX), building power and physical security metrics and data flows etc. These inputs may be converted into a normative model of individual devices on the network and the overall topological 'shape' of the devices external and internal communications.

In accordance with an aspect of the invention there is provided a method for detection of a cyber-threat to a computer system, the method arranged to be performed by a processing apparatus, the method comprising receiving input data associated with a first entity associated with the computer system, deriving metrics from the input data, the metrics representative of characteristics of the received input data, analysing the metrics using one or more models, and determining, in accordance with the analysed metrics and a model of normal behavior of the first entity, a cyber-threat risk parameter indicative of a likelihood of a cyber-threat.

The method may further comprise updating the model of normal behavior of the first entity in accordance with the analysis of the metrics. The received input data may include data relating to activity on the computer system associated with the first entity. The derived metrics may reflect a usage of the computer system by the first entity over a period of time. The derived metrics may be network traffic related metrics associated with activity of the first entity on the computer system. The derived metrics may be derived from header analysis on an Internet Layer protocol level of the computer system. The method may further comprise selecting the plurality of metrics from a range of possible metrics before deriving the plurality of metrics. The one or more models may include a first model arranged to analyse data for detecting a first type of threat. The one or more models may include a second model arranged to analyse data for detecting a second type of threat. The cyber-threat risk parameter may be a probability of the likelihood of a threat. The probability may be determined using a recursive Bayesian estimation. The method may further comprise determining whether or not there is a threat by comparing the cyber-threat risk parameter with a threshold. The threshold may be a moving threshold. The cyber-threat risk parameter may be determined by comparing the analysed metrics with the model of normal behavior of the first entity. The method may further comprise predicting an expected behavior of the first entity based on the model of normal behavior. The determining the cyber-threat risk parameter may comprise comparing the analysed metrics with the expected behavior. The method may further comprise receiving input data associated with a second entity, wherein the determining the cyber-threat risk parameter comprises taking the input data associated with the second entity into consideration. The entity may be a user of the computer system. The entity may be a device forming part of the computer system. The entity may form part of an industrial control system connected to or forming part of the computer system. The computer system may be a network of computing devices.

According to another aspect of the invention there is provided a computer readable medium comprising computer readable code operable, in use, to instruct a computer to perform any method disclosed herein.

According to a further aspect of the invention there is provided a computer program comprising computer readable code operable, in use, to instruct a computer to perform any method disclosed herein.

According to yet another aspect of the invention there is provided a threat detection system comprising a processor and a memory comprising computer readable code operable, in use, to instruct the processor to perform any method disclosed herein.

The computer system may be a single computer. Alternatively, the computer system may be a network of computers and/or other electronic devices. The computer system may also be a collection of networks. When the computer system is a single computer, the processing apparatus may be a processor of the computer. The processing apparatus may be part of the computer system.

The method may further comprise developing a pattern of life for a user in the form of a model. The may further comprise developing the pattern of life based on various data gathered regarding the user.

The method may involve automatic real-time cyber-threat detection. The model may be an unsupervised mathematical model. The model may be a normative model. The model may be a self-learning model. Probes may analyse the metrics. The system may have a non-frequentist architecture. The model may be ever-changing. The model may comprise user defined heuristics. The model may be updated when new data is received. The model may be updated when new data is received that is deemed within the limits of normal behavior.

Activity by the user may comprise interactions with other entities of the computer system. When the entity is a user (i.e. user account) these interactions may be with other users or with devices forming part of the computer system.

The metrics may represent characteristics of the received input data. The characteristics may include quantification of the input data. The characteristics may include simplification of the input data.

The threshold used for determining if there is a threat may be a moving threshold. The moving threshold may be varied according to changes in the computer system.

The presence of unexpected behavior may be indicative of a threat. The absence of expected behavior may be indicative of a threat.

The determining of the cyber-threat risk parameter taking the input data associated with the second entity into consideration may involve analysing causal links between data associated with the first entity and data associated with the second entity. The link between data associated with any number of entities on the computer system may be taken into consideration when performing the threat detection method.

BRIEF DESCRIPTION OF THE DRAWINGS

Exemplary embodiments of the invention shall now be described with reference to the drawings in which.

Throughout the description and the drawings, like reference numerals refer to like parts.

SPECIFIC DESCRIPTION

Figure 1:
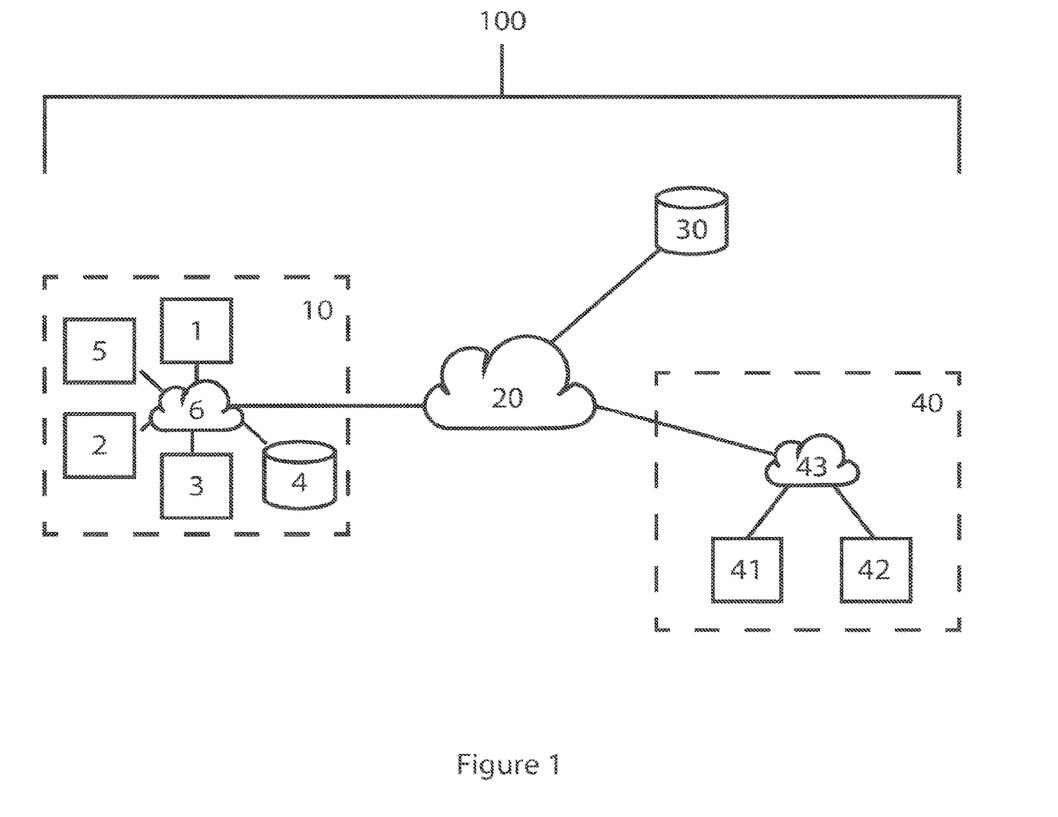
FIG. 1 illustrates a network of computer systems 100 using a threat detection system according to an embodiment of the invention.

FIG. 1 illustrates a network of computer systems 100 using a threat detection system according to an embodiment of the invention. The system depicted by FIG. 1 is a simplified illustration which is provided for ease of explanation of the invention.

The system 100 comprises a first computer system 10 within a building, which uses the threat detection system to detect and thereby attempt to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 1.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 am and midday, and is active from about 8.30 am until 6 pm. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise.

This behavioral delta can be observed and acted on with the novel form of Bayesian mathematical analysis used by the threat detection system installed on the computer 1.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional endpoint defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

Figure 2:
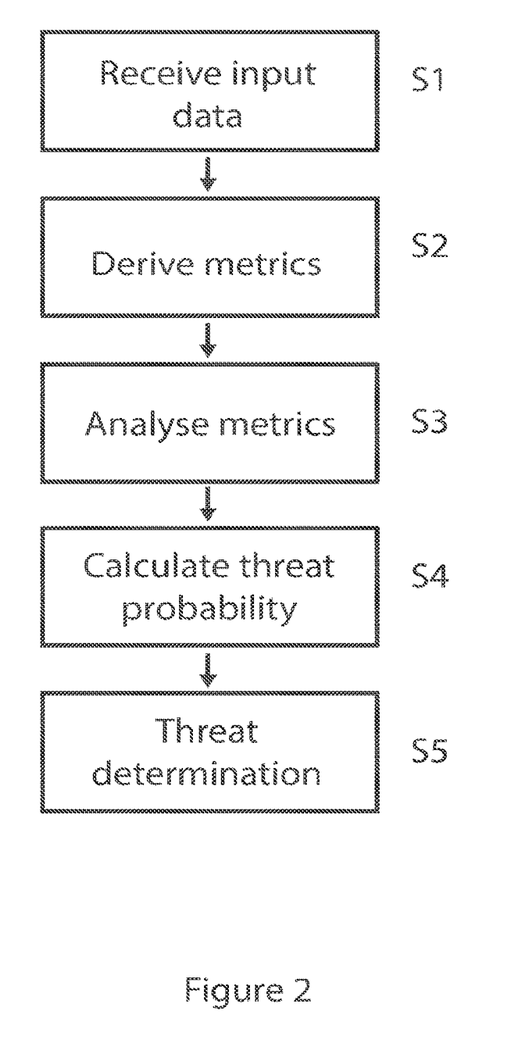
FIG. 2 illustrates a flow diagram of the process carried out by the threat detection system for automatic detection of cyber threats.

The threat detection system shall now be described in further detail with reference to FIG. 2, which provides a flow diagram of the process carried out by the threat detection system for automatic detection of cyber threats through probabilistic change in normal behavior through the novel application of an unsupervised Bayesian mathematical model to detect behavioral change in computers and computer networks.

The core threat detection system is termed the 'hyper cylinder'. The hyper cylinder is a Bayesian system of automatically determining periodicity in multiple time series data and identifying changes across single and multiple time series data for the purpose of anomalous behavior detection.

Human, machine or other activity is modelled by initially ingesting data from a number of sources at step S1 and deriving second order metrics at step S2 from that raw data. The raw data sources include, but are not limited to:

Raw network IP traffic captured from an IP or other network TAP or SPAN port

Machine generated log files.

Building access ("swipe card") systems.

IP or non IP data flowing over an Industrial Control System (ICS) distributed network Individual machine, peripheral or component power usage.

Telecommunication signal strength.

Machine level performance data taken from on-host sources (CPU usage/memory usage/disk usage/disk free space/network usage/etc)

From these raw sources of data, a large number of metrics can be derived each producing time series data for the given metric. The data are bucketed into individual time slices (for example the number observed could be counted per 1 second, per 10 seconds or per 60 seconds), which can be combined at a later stage where required to provide longer range values for any multiple of the chosen internal size. For example if the underlying time slice chosen is 60 seconds long and thus each metric time series stores a single value for the metric every 60 seconds, then any new time series data of a fixed multiple of 60 seconds (120 seconds, 180 seconds, 600 seconds etc) can be computed with no loss of accuracy. Metrics are chosen directly and fed to the hyper cylinder by a lower order model which reflects some unique underlying part of the data, and which can be derived from the raw data with particular domain knowledge. The metrics that are obtained depends on the threats that the system is looking for. In order to provide a secure system it is common for a large number of metrics relating to a wide range of potential threats to be obtained.

The actual metrics used are largely irrelevant to the Hyper Cylinder system which is described here, but some examples are provided below.

Metrics derived from network traffic could include data such as:

The number of bytes of data entering or leaving a networked device per time interval.

Probe output such as—File access change point.

Invalided SSL certification.

Failed authorisation attempt.

Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:

The number of multicasts per time interval originating from a networked device and intended to reach publicly addressable IP ranges.

The number of internal link-local IP Broadcast requests originating from a networked device.

The size of the packet payload data.

The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analysed, further types of time series metric can be defined, for example:

The number of DNS requests a networked device generates per time interval, again either to any definable target network range or in total.

The number of SMTP, POP or IMAP logins or login failures a machine generates per time interval.

The number of LDAP logins or login failures a generated.

Data transferred via file sharing protocols such as SMB, SMB2, FTP, etc

Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear. Ideally the system receives a copy of each internal packet via a SPANing connection.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilisation, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, probes carry out analysis of the second order metrics. Probes are discrete mathematical models that implement a specific mathematical method against different sets of variables with the target network. For example, HMM may look specifically at the size and transmission time of packets between nodes. The probes are provided in a hierarchy which is a loosely arranged pyramid of models. Each probe or model effectively acts as a filter and passes its output to another model higher up the pyramid. At the top of the pyramid is the Hyper Cylinder which is the ultimate threat decision making model. Lower order probes each monitor different global attributes or 'features' of the underlying network and or computers. These attributes consist of value over time for all internal computational features such as packet velocity and morphology, end point file system values, and TCP/IP protocol timing and events. Each probe is specialised to record and make decisions on different environmental factors based on the probes own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or probes that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing probes and local contextual information. These chains of logical expression are then stored in and/or on online libraries and parsed in real-time against output from the measures/tokenizing probes. An example policy could take the form of "alert me if any employee subject to HR disciplinary circumstances (contextual information) is accessing sensitive information (heuristic definition) in a manner that is anomalous when compared to previous behavior (Hyper Cylinder output)". In other words, different arrays of pyramids of probes are provided for detecting particular types of threats.

The analysis performed by the probes on the second order metrics then outputs data in a form suitable for use with the model of normal behavior. As will be seen, the data is in a form suitable for comparing with the model of normal behavior and for updating the model of normal behavior.

At step S4, the threat detection system computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the hyper cylinder has computed to be most relevant within the observed network and or machines. Furthermore, the pattern of life analysis identifies how a human and/or machine behaves over time, i.e. when they typically start and stop work. Since these models are continually adapting themselves automatically they are inherently harder to defeat than known systems.

The threat risk parameter is a probability of there being a threat in certain arrangements. Alternatively, the threat risk parameter is a value representative of there being a threat which is compared against one or more thresholds indicative of the likelihood of a threat.

In practice, the step of computing the threat involves comparing current data collected in relation to the user with the model of normal behavior of the user. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

In order to improve the accuracy of the system a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Hyper Cylinder, a novel form of threat visualisation is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D remote observer perspective interface. The projection is able to scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topologically rewiring and semantically evolving over time. In many high-dimensional structured I/O problems, such as the observation of packet traffic and host activity within an enterprise LAN or WAN, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

In a further arrangement, the system permits behavioral abnormality detection within the interactions and, crucially, state of entities within Industrial Control Systems (ICS) whether on-site (e.g. DCS/PLC) and geographically dispersed in the field (e.g. SCADA). This is achieved by combining the Hyper Cylinder with a bespoke smart thresholding ICS protocol aware programmable probe. This creates individual machine models of all entities (e.g. actuator, thermostat, etc.) and remains effective in a mixed-technology environment where a range of industrial control protocols and transport mechanisms are deployed, some of which may be rare and/or proprietary. The objective of the modelling and monitoring is to identify and allow response to attacks that may enable malicious control by an unapproved actor, loss of operator view, manipulation of operator view, and denial of operator control. The system could therefore be applied to any other control of remote devices from aircraft to military systems, as well as the Internet of Things.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-RAN or DVD.

An apparatus such as a computer may be configured in accordance with such code to perform one or more processes in accordance with the various methods discussed herein. Such an apparatus may take the form of a data processing system. Such a data processing system may be a distributed system. For example, such a data processing system may be distributed across a network.

What is claimed is:

1. A method for detection of a cyber-threat to a computer system, the method arranged to be performed by one or more processing apparatuses, the method comprising:

receiving input data that comprises data associated with a first entity related to activity on the computer system and data associated with a second entity;

deriving from the received input data metrics representative of characteristics of the received input data;

analyzing the derived metrics using a first self-learning model trained on a normal behavior of at least the first entity;

analyzing one or more causal links between data associated with the first entity and data associated with the second entity gathered over one or more days, predicting an expected behavior of at least the first entity of the computing system based on the first self-learning model;

determining, in accordance with the analyzed derived metrics and the one or more causal links, a cyber-threat risk parameter indicative of a likelihood of the cyber-threat, wherein determining the cyber-threat risk parameter comprises comparing the analyzed, derived metrics with the predicted expected behavior, comparing whether parameters of the analyzed, derived metrics fall outside the parameters set by a threat parameter benchmark, and considering the one or more causal links that include a comparison between a behavior of the first entity based on analyzed, derived metrics associated with the first entity to a behavior of the second entity based on analyzed, derived metrics associated with the second entity, wherein the first entity is a first user and false positives are mitigated by at least considering unusual behavior by the first user as being normal behavior by the first user when similar unusual behavior is observed as being conducted by a second user, and wherein the first self-learning model trained on the normal behavior of at least the first entity develops a pattern of life for the first entity based on data gathered regarding the first entity over time, where the pattern of life for the first entity is dynamically updated as more information is gathered over time of operation of the first self-learning model monitoring the first entity, where what is considered the normal behavior is used as a moving benchmark, allowing a threat detection system to spot behavior for the first entity that seems to fall outside of the normal behavior for the pattern of life, where the threat detection system flags the behavior for the first entity that seems to fall outside of the normal behavior for the pattern of life as anomalous, requiring further investigation, where the use of the first self-learning model trained on the normal behavior of at least the first entity to develop the pattern of life for the first entity based on data gathered regarding the first entity over time combined with the predicting of the expected behavior of the first entity of the computing system based on the first self-learning model trained on normal behavior produces the detection of the cyber-threat to the computer system, where the first self-learning model trained on the normal behavior of at least the first entity is specifically an unsupervised mathematical model used for detecting behavioural change.

2. The method according to claim 1, further comprising: wherein the modelled behavior in the first model of the first entity includes at least one of detecting a change in a pattern in any of 1) information, 2) activity, or a 3) combination of both information about the first entity and activity of the first entity in order to be able to detect both a change in behavior of the first user a user using the computing system as well as a change in behavior of a device in the computing system, where the first entity is the device in the computing system.

3. The method according to claim 1, wherein the derived metrics are derived from header analysis on an Internet Layer protocol level of the computer system.

4. The method according to claim 1, further comprising: flagging the behavior for the first entity that seems to fall outside of the normal behavior for the pattern of life by projecting the behavior on a three-dimensional (3D) graphical user interface that conveys a connection topology corresponding to the computing system.

5. The method according to claim 1, further comprising: using a second self-learning model trained on a normal behavior of at least the second entity to determine what is normal behavior for at least the second entity, using a third model trained to analyze data for detecting a first type of threat, and using a fourth model trained to analyze data for detecting a second type of threat.

6. The method according to claim 1, wherein the cyber-threat risk parameter is a probability of the likelihood of a threat determined using a recursive Bayesian estimation.

7. The method according to claim 6, further comprising: dynamically assigning recurring time cycles to a normal behavior threshold.

8. A non-transitory computer readable medium comprising computer readable code that is configured to be operable, when executed by one or more processing apparatuses in the computer system, in order to instruct a computing device to perform the method of claim 1.

9. The method according to claim 1, wherein the entity corresponds to the first user being a first user account and the second entity corresponds to a second user account different from the first user account.

10. A threat detection system, comprising:
at least one or more ports configured to receive input data that comprises data associated with a first entity related to activity on a computer system and data associated with a second entity;
a non-transitory memory configured to store instructions and data for a first self-learning model trained on a normal behavior of a pattern of life for at least the first entity that is dynamically updated as more information is gathered over time of operation of the first self-learning model monitoring the first entity in an executable format to be executed by one or more processors; and
wherein the one or more processors are configured to execute the instructions to perform operations including
deriving from the received input data metrics representative of characteristics of the received input data, analyzing the derived metrics using the first self-learning model trained on the normal behavior of at least the first entity, analyzing one or more causal links between data associated with the first entity and data associated with the second entity gathered over one or more days, predicting an expected behavior of the first entity of the computing system based on the first self-learning model, and determining, in accordance with the analyzed derived metrics and the analysis of the one or more causal links, a cyber-threat risk parameter indicative of a likelihood of a cyber-threat, wherein determining the cyber-threat risk parameter comprises comparing the analyzed, derived metrics with the predicted expected behavior, comparing whether parameters of the analyzed, derived metrics fall outside the parameters set by a threat parameter benchmark, and considering the one or more causal links that include a comparison between a behavior of the first entity based on analyzed, derived metrics associated with the first entity to a behavior of the second entity based on analyzed, derived metrics associated with the second entity, wherein the first entity is a first user and false positives are mitigated by at least considering unusual behavior by the first user as being normal behavior by the first user when similar unusual behavior observed as being conducted by a second user,
wherein the first self-learning model trained on the normal behavior of at least the first entity is configured to develop a pattern of life for the first entity based on data gathered regarding the first entity over time, where the pattern of life for the first entity is dynamically updated as more information is gathered over time of operation of the first self-learning model monitoring the first entity, where what is considered the normal behavior is used as a moving benchmark, allowing the threat detection system to spot behavior for the first entity that seems to fall outside of the normal behavior for the pattern of life, where the threat detection system is configured to flag the behavior for the first entity that seems to fall outside of the normal behavior for the pattern of life as anomalous, requiring further investigation, where the use of the first self-learning model trained on the normal behavior of at least the first entity to develop the pattern of life for the first entity based on data gathered regarding the first entity over time combined with the predicting of the expected behavior of the first entity of the computing system based on the first self-learning model trained on normal behavior produces the detection of the cyber-threat to the computer system and the first self-learning model trained on the normal behavior of at least the first entity is specifically an unsupervised mathematical model used for detecting behavioural change.

11. The threat detection system according to claim 10, wherein the processor is further configured to execute the instructions to analyze the derived metrics using a second self-learning model trained on a normal behavior of at least the second entity, to use a third self-learning model trained on a first type of threat, and to use a fourth self-learning model trained on a second type of threat.

12. The threat detection system according to claim 10, where the threat detection system is configured to flag the behavior for the first entity that seems to fall outside of the normal behavior for the pattern of life by projecting the behavior on a three-dimensional (3D) graphical user interface that conveys a connection topology corresponding to the computing system.

13. The threat detection system according to claim 10, where the modelled behavior in the first model of the first entity includes at least one of detecting a change in a pattern in any of 1) information, 2) activity, or a 3) combination of both information about the first entity and activity of the first entity in order to be able to detect both a change in behavior of the first user as well as a change in behavior of a device in the computing system, where the second entity is the device in the computing system.

14. The threat detection system according to claim 10, wherein the derived metrics are network traffic related metrics associated with activity of the first entity on the computer system reflecting a usage of the computer system by the first entity over a period of time.

15. The threat detection system according to claim 10, wherein the cyber-threat risk parameter is a probability of the likelihood of a threat determined using a recursive Bayesian estimation, and where the processor is further configured to execute the instructions to dynamically assign recurring time cycles to a normal behavior threshold.

16. The threat detection system according to claim 10, wherein results of the cyber-threat risk parameter are projected on a three-dimensional (3D) graphical user interface that conveys cyber threats across a packet flow and connection topology corresponding to the computing system.

17. A network, comprising:
at least one network switch;
multiple computing devices operable by users of the network;
a threat detection system that includes
at least one or more ports configured to receive input data that comprises data associated with a first entity related to activity on a computer system and data associated with a second entity;

a non-transitory memory configured to store computer readable code and data for a first self-learning model trained on a normal behavior a pattern of life for at least the first entity that is dynamically updated as more information is gathered over time of operation of the first self-learning model monitoring the first entity; and a processor configured to execute the computer readable code to derive from the received input data metrics representative of characteristics of the received input data, to analyze the derived metrics using a first self-learning model trained on a normal behavior of at least the first entity, to analyze one or more causal links between data associated with the first entity and data associated with the second entity gathered over one or more days, to predict an expected behavior of the first entity of the computing system based on the first self-learning model, and to determine, in accordance with the analyzed derived metrics and the one or more causal links, a cyber-threat risk parameter indicative of a likelihood of a cyber-threat, wherein to determine the cyber-threat risk parameter, the processor is further to compare the analyzed, derived metrics with the predicted expected behavior, to compare whether parameters of the analyzed, derived metrics fall outside the parameters set by a threat parameter benchmark, and consider the analysis of the one or more causal links that include a comparison between a behavior of the first entity based on analyzed, derived metrics associated with the first entity to a behavior of the second entity based on analyzed, derived metrics associated with the second entity, wherein the first entity is a first user and false positives are mitigated by at least considering unusual behavior by the first user as being normal behavior by the first user when similar unusual behavior observed as being conducted by a second user, wherein the first self-learning model trained on the normal behavior of at least the first entity is configured to develop a pattern of life for the first entity based on data gathered regarding the first entity over time, where the pattern of life for the first entity is dynamically updated as more information is gathered over time of operation of the first self-learning model monitoring the first entity, where what is considered the normal behavior is used as a moving benchmark, allowing the threat detection system to spot behavior for the first entity that seems to fall outside of the normal behavior for the pattern of life, where the threat detection system is configured to flag the behavior for the first entity that seems to fall outside of the normal behavior for the pattern of life as anomalous, requiring further investigation and wherein the use of the first self-learning model trained on the normal behavior of at least the first entity to develop the pattern of life for the first entity based on data gathered regarding the first entity over time combined with the predicting of the expected behavior of the first entity of the computing system based on the first self-learning model trained on normal behavior produces the detection of the cyber-threat to the computer system and the first self-learning model trained on the normal behavior of at least the first entity is specifically an unsupervised mathematical model used for detecting behavioural change.

* * * * *